United States Patent [19]

Röttger

[11] Patent Number: 4,901,366
[45] Date of Patent: Feb. 13, 1990

[54] CIRCUIT ARRANGEMENT FOR THE TIMED CONTROL OF SEMICONDUCTOR SWITCHES

[75] Inventor: Michael Röttger, Glashütten, Fed. Rep. of Germany

[73] Assignee: VDO Adolf Schindling AG, Frankfurt am Main, Fed. Rep. of Germany

[21] Appl. No.: 197,005

[22] Filed: May 20, 1988

[30] Foreign Application Priority Data

May 21, 1987 [DE]  Fed. Rep. of Germany ....... 3716995
May 30, 1987 [DE]  Fed. Rep. of Germany ....... 3718309

[51] Int. Cl.$^4$ .............................................. H02P 1/00
[52] U.S. Cl. .................................. 388/811; 388/910; 388/915; 388/921; 388/909; 388/930
[58] Field of Search ............... 318/293, 294, 257, 280, 318/282

[56] References Cited

U.S. PATENT DOCUMENTS

| | | | |
|---|---|---|---|
| 4,066,940 | 1/1978 | Henderson | 318/294 |
| 4,217,528 | 8/1980 | Scheying et al. | 318/293 |
| 4,388,571 | 6/1983 | Tada et al. | 318/293 |
| 4,477,751 | 10/1984 | Kanayama | 318/293 X |
| 4,527,103 | 7/1985 | Kade | 318/293 |
| 4,544,869 | 10/1985 | Pittaway | 318/293 |
| 4,562,393 | 12/1985 | Loyzim et al. | 318/341 X |
| 4,568,864 | 2/1986 | Gisske | 318/294 |
| 4,581,565 | 4/1986 | Van Pelt et al. | 318/294 |
| 4,616,305 | 10/1986 | Damiano et al. | 318/293 X |
| 4,649,326 | 3/1987 | Mansmann et al. | 318/293 |
| 4,686,438 | 8/1987 | Ohe et al. | 318/293 |
| 4,710,686 | 12/1987 | Guzik | 318/293 |

Primary Examiner—Bernard Roskoski
Attorney, Agent, or Firm—Martin A. Farber

[57] ABSTRACT

In a circuit arrangement for the timed control of semiconductor switches (1-4) to each of which a freerunning diode (D1-D4) is connected in parallel and which are arranged in branches of a bridge, an ohmic-inductive load (5) of low loss power which lies in the diagonals of the bridge is to be acted on by a controlled average current value. For this purpose two semiconductor switches (for instance 1, 4) lying diagonally opposite each other in the bridge are closed in a current-application phase while in the following freerunning phase a freerunning current flows through the load. For the reduction of the loss power, at the start of the freerunning phase only one (1) of the two diagonally opposite semiconductors (1,4) is opened and a semiconductor switch (3) which lies in the bridge alongside the conductive semiconductor switch (4) is then closed. Before the start of a current-application phase which follows this, the semiconductor switch (3) which lies in the bridge alongside the closed semiconductor switch (4) is opened before the opened semiconductor switch (1) of the two diagonally opposite semiconductor switches (1,4) is closed again.

15 Claims, 11 Drawing Sheets

CIRCUIT ARRANGEMENT FOR THE TIMED CONTROL OF SEMICONDUCTOR SWITCHES

FIELD AND BACKGROUND OF THE INVENTION

The present invention relates to a circuit arrangement for the timed control of semiconductor switches.

In particular, the invention relates to a circuit arrangement for the timed control of semiconductor switches, in parallel with each of which there is a free-running diode, and which are arranged in branches of a bridge in the diagonals of which there is an ohmic-inductive load, in particular a dc motor, two semiconductor switches which lie diagonally opposite each other in the bridge and are closed during a current-application phase, and a freerunning current flowing through the load in the freerunning phase.

In known circuit arrangements of the aforementioned type, the control of, in each case, two semiconductor switches lying diagonally opposite each other in the bridge in the same direction is effected by one control signal so that both semiconductor switches are closed simultaneously at the start of a current-application phase so that during that phase the amount of current in the load increases, and in the following freerunning phase they are placed simultaneously into the non-conductive state. During the freerunning phase the current in the load decreases and flows back via freerunning diodes into a source of voltage, for instance an automobile battery, which feeds the circuit arrangement. The average current which is established in the load, i.e. the consuming device, results in this case from the pulse duty factor of the controlled semiconductor switches, i.e. the ratio of the connect time to the disconnect time, and the time constants of the ohmic-inductive load as well as other load parameters. Depending on which pair of the semiconductor switches that lie diagonally opposite each other in the bridge is controlled in timed fashion while the other pair of semiconductor switches in each case is blocked, the current flows in positive or negative direction in the load. In this known circuit arrangement, therefore, the freerunning diodes conduct the entire current flowing through the load in the freerunning phase (freerunning current). The freerunning current, however, produces a relatively large voltage drop in the freerunning diodes and thus a high loss power.

SUMMARY OF THE INVENTION

It is an object of the present invention so to improve a circuit arrangement of the aforementioned type that the loss power is reduced.

According to the invention, at the start of a freerunning phase only one (1) of the two diagonally opposite semiconductor switches (1, 4) is opened and thereupon a semiconductor switch (3) lying in the bridge alongside the conductive semiconductor switch (4) is closed and before the start of a then following current-application phase the semiconductor switch (3) lying in the bridge alongside the conductive semiconductor switch (4) is opened before the opened semiconductor switch (1) of the two diagonally opposite semiconductor switches (1, 4) is again closed.

The invention is based on the principle that two semiconductor switches lying diagonally opposite each other in the bridge are no longer controlled simultaneously in the same direction so that they conduct or block simultaneously while in each case the other two semiconductor switches lying diagonally in the bridge are blocked. Rather, in accordance with the invention, the four semiconductor switches of the bridge are controlled separately and individually by control circuits the construction of which is defined by the function described hereinafter. In particular, the four semiconductor switches arranged in the bridge include four control circuits in order to exert a different control function for each semiconductor switch. The four control signals which control the individual semiconductor switches are produced by the control circuits can be determined by a common desired-value signal and possibly a common fed-back actual-value signal. The desired-value signal and the actual-value signal can, for instance, be desired and actual average current values in the load which lies in the bridge formed with the four semiconductor switches. If a dc motor of a servo-drive serves as load, then the desired value and the actual value can also be formed by a desired position value of the servo-drive and the actual position value thereof. A position control with underlying current regulation is also realizable.

The essence of the invention resides therein that the freerunning current is no longer conducted only through the freerunning diodes but through a pre-established semiconductor switch in the bridge, which switch lies in parallel to one of the two semiconductor switches lying diagonally opposite each other in the bridge and which are closed during the current-application phase within a different branch of the bridge while the said semiconductor switch to which it lies in parallel remains closed in the conductive state also in the freerunning phase. Due to this, the freerunning current flows essentially via these two closed semiconductor switches on which thus only slight voltage drops occur. The loss power is correspondingly small. The energy which is fed to the load from the voltage source can thereby be used more effectively. In the event that a dc motor serves as load, its torque will drop only slightly in the freerunning phase. The merely slight freerunning voltage which is induced on the load is furthermore advantageous.

The control circuit for the semiconductor switch which predominantly takes over the freerunning current provides assurance that said switch only conducts when the semiconductor switch lying in series with it in the bridge circuit is blocked, so that a high longitudinal current is prevented over these semiconductor switches which lie in series. The control circuit for the timed semiconductor switch of the two switches lying diagonally opposite each other in the bridge is again such that, before a following current-application phase, the semiconductor switch which had taken over the freerunning current together with the diode lying in parallel to it is first blocked. The control circuit for the second of the two semiconductor switches which lie diagonally opposite each other in the bridge and which conduct the load current in the current-application phase need simply effect a continuous conduction of this semiconductor switch during the given direction of the current in the load. The last of the four semiconductor switches in the bridge has such a control circuit that it remains at all times open for this direction of the current in the load.

The control circuit for the semiconductor switch in the bridge branch which lies alongside the bridge branch with the conductive semiconductor switch of the semiconductor switches lying diagonally opposite each other in the bridge which conduct the current through the load in the current-application phase is to particular advantage developed in the manner that, in the freerunning phase, the semiconductor switch (3) which lies in the bridge alongside the conductive semiconductor switch (4) is closed when the freerunning diode (D3) thereof has taken over the freerunning current, whereby the semiconductor switch is closed during the freerunning phase is only controlled into this condition when the freerunning diode lying parallel to it has taken over the freerunning current.

In this way, assurance is had that the semiconductor switch lying in series with this semiconductor switch in the bridge is blocked and longitudinal current is prevented over both semiconductor switches.

In order to control the above-mentioned control circuit and further control circuits, one for each semiconductor switch, there is advantageously provided a monitoring circuit (13) which monitors the voltage on the load (5) and the switch states of the semiconductor switches (1–4) and controls in each case one control circuit (7–10) for each semiconductor switch, whereby the monitoring circuit prevents, as a whole, longitudinal currents, i.e. the currents which act on the source of voltage but do not flow over the load and which can endanger also the semiconductor switches conducting them.

Instead of this monitoring of the switch states of the semiconductors by means of the monitoring circuit, a waiting time generator (33) can be provided for producing fixed waiting times, each of which controls a control circuit (7–12) for each semiconductor switch, whereby the monitoring circuit also upon the switching from a current-flow phase to a freerunning phase and vice versa prevents longitudinal currents through two bridge branches which lie in series. The waiting times can be produced in the waiting time generator by counters, monostable multivibrators or matching functions which are produced, for instance, by a resistorcapacitor combination. Instead of fixed waiting times, variable waiting times can also be provided, for example times which are dependent on the supply voltage and/or the amount of the load current.

For the timed operation of the semiconductor switches in the bridge with a pulse duty factor which corresponds, in particular, to the difference between a desired-value signal and an actual-value signal, the control circuits are controlled by a pulse-length modulator (14).

If a reversal of current direction from positively counted to negatively counted current is desired in the load, which also can be determined by the difference between desired-value signal and actual-value signal, the control circuits for the semiconductor switches in the bridge are widened wherein for the controlled current-direction reversal in the load during a freerunning phase the semiconductor switch (4) which is still closed of the two diagonally opposite semiconductor switches (1–4) is opened while the semiconductor switch (3) which lies in the bridge alongside of said semiconductor switch (4) remains closed and thereupon the semiconductor switch (2) which lies diagonally opposite said last-mentioned semiconductor switch (3) is closed; and for the controlled current-direction reversal in the load during the current-application phase there is first of all opened that one (1) of the two diagonally opposite semiconductor switches (1, 4) which was timed-switched before the reversal of the direction of current and thereupon the semiconductor switch (3) lying in the bridge alongside the conductive semiconductor switch (4) of the two diagonally opposite semiconductor switches is closed, whereupon the semiconductor switch of the two diagonally opposite semiconductor switches (1–4) which is still closed is opened while the semiconductor switch (3) lying in the bridge alongside of said semiconductor switch (4) remains closed, and thereupon the semiconductor switch (2) lying diagonally opposite said last-mentioned semiconductor switch (3) is closed.

With respect to the first above-mentioned construction, in this connection the features of the control circuit for the controlled reversal of direction of current in the load during a freerunning phase are provided.

With respect to the second above-mentioned construction, the extensions which are to be effected for the controlled current-direction reversal during the flow phase is obtained. If the current-direction reversal is to take place the semiconductor switches are thus first of all to be brought from the current-application phase into the freerunning phase. The reversing of the four control circuits for the semiconductor switches in the bridge is controlled by a common current-direction reversal circuit.

According to a feature of the invention, current-direction reversal circuit (12) in each case controls a control circuit for each semiconductor switch.

As semiconductor switches (1–4) in the bridge there are preferably used MOSFET transistors, each having an integrated freerunning diode.

Other variations of semiconductor switches in the bridge which are suitable depending on the purpose of use are as follows:

Each of the semiconductor switches (3, 4) comprises two interconnected NPN bipolar transistors (36, 37) with an additional freerunning diode (D3; D4).

Also, two semiconductor switches (3; 4) lying alongside of each other in the bridge are MOSFET semiconductors and two other semiconductor switches (1; 2) lying alongside each other in the bridge are bipolar transistors.

BRIEF DESCRIPTION OF THE DRAWINGS

With the above and other objects and advantages in view, the present invention will become more clearly understood in connection with the detailed description of preferred embodiments, when considered with accompanying drawings, of which.

DETAILED DESCRIPTION OF THE PREFERRED EMBODIMENTS

In FIGS. 1 and 2, 1-4 are semiconductor switches which are arranged in a bridge circuit. An ohmic-conductive load 5 is present in one of the diagonals of the bridge. The bridge is fed by a source of voltage 6 of polarity +U shown in FIG. 1. A freerunning diode D1-D4 is connected directly in parallel to each of the controlled switches 1-4.

Figure 1:
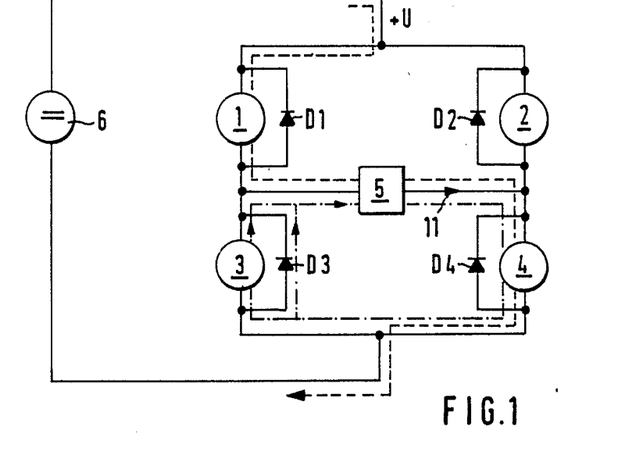
FIG. 1 shows a bridge output stage in a greatly simplified circuit diagram, without control circuits, with current paths during a current-application phase as well as a freerunning phase.
Figure 2:
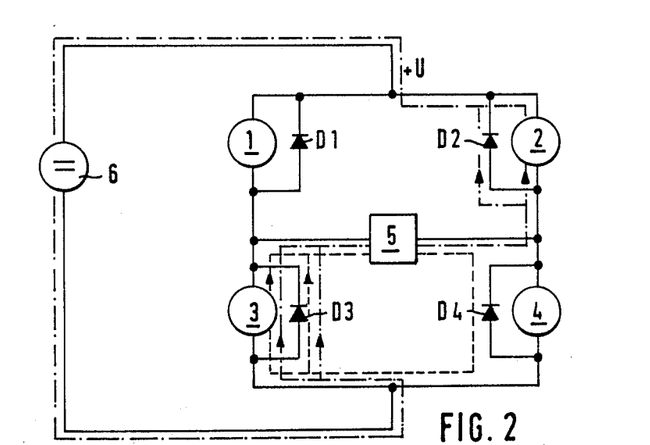
FIG 2 illustrates a bridge output stage according to FIG. 1 in which the path of the current is shown in a freerunning phase after reversal of the direction of the current and before the disappearance of the current.
Figure 3:
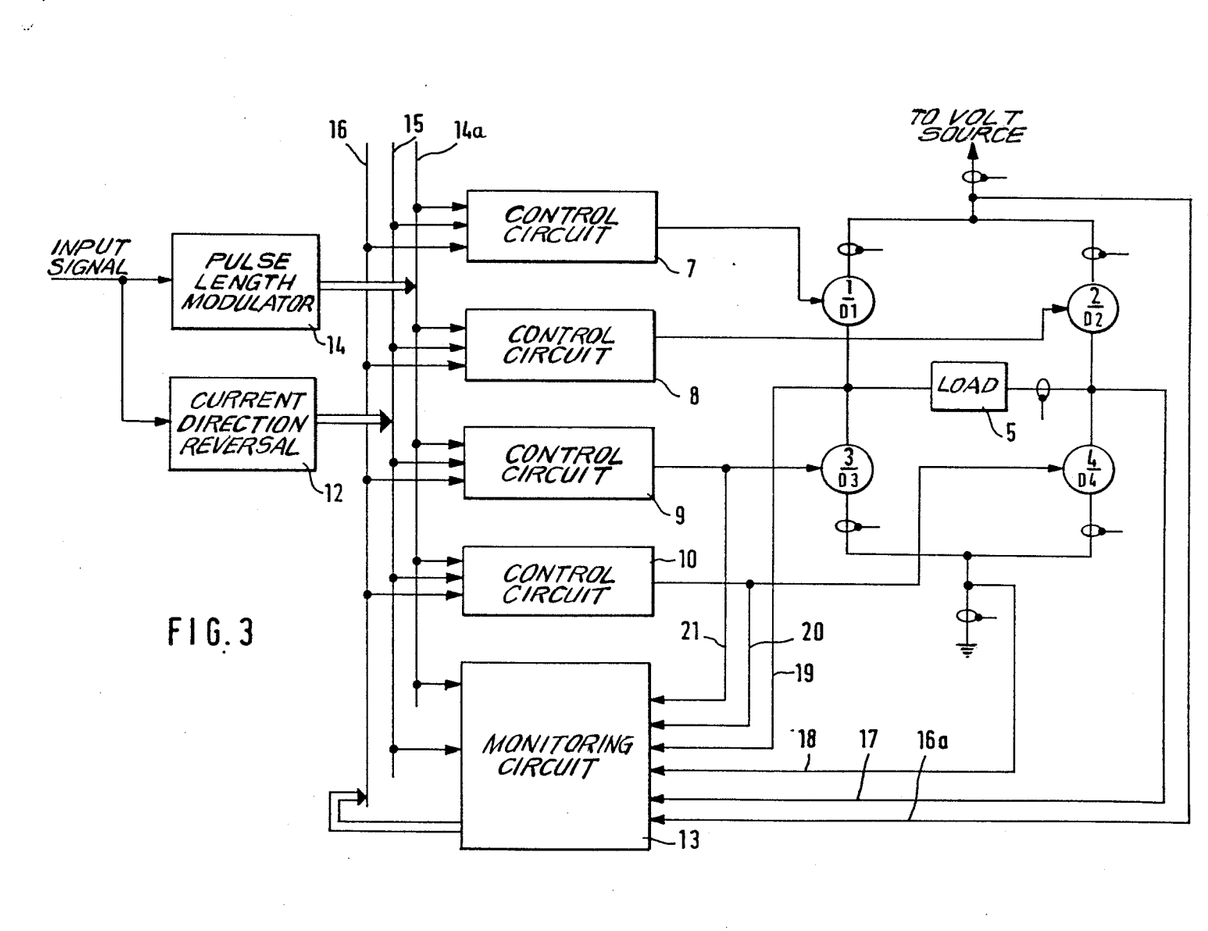
FIG. 3 shows a bridge output stage with semiconductor switches which comprise integrated freerunning diodes, with control circuits and a monitoring unit which controls the control circuits.
Figure 4:
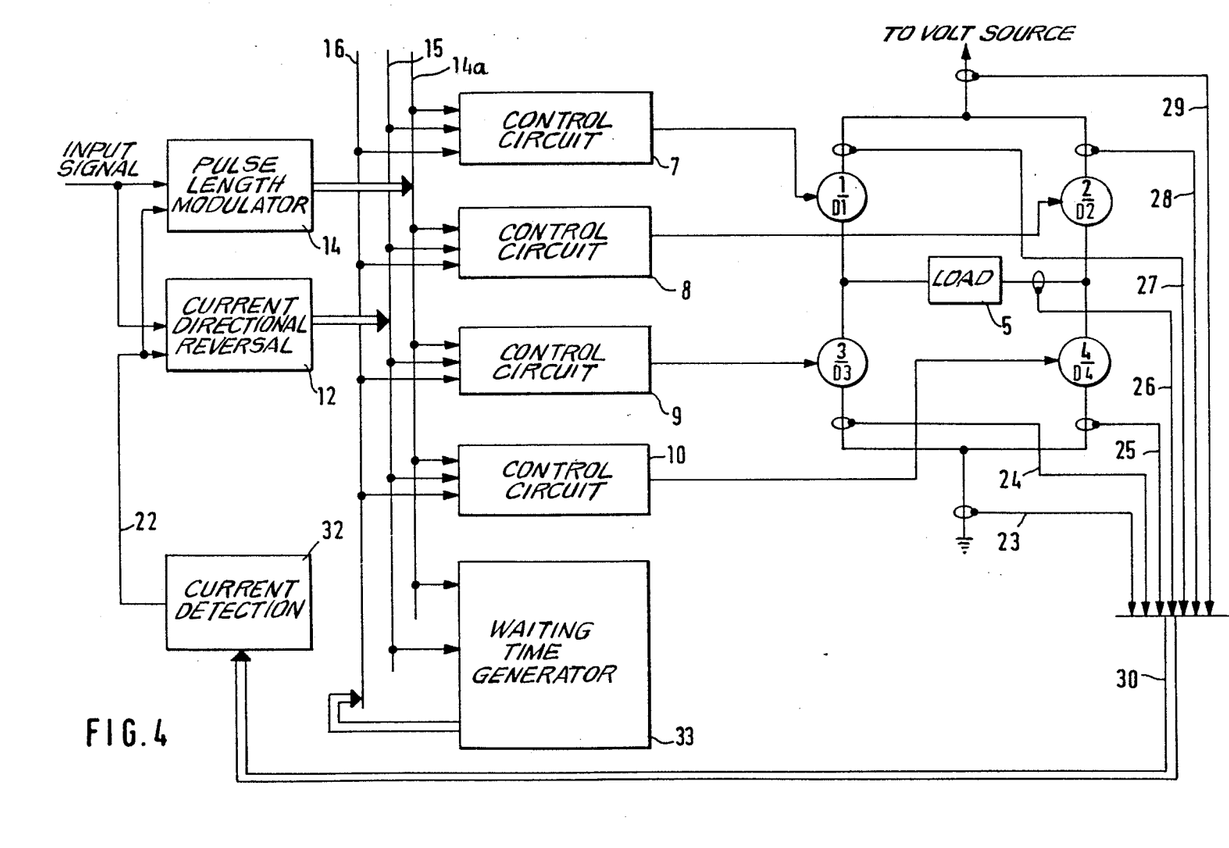
FIG. 4 shows a variation of the circuit arrangement of FIG. 3 in which, instead of a monitoring unit, a waiting-time generator controls the control circuits, and which has a current-detection circuit which forms an actual-value signal which controls the entire circuit arrangement.
Figure 5:
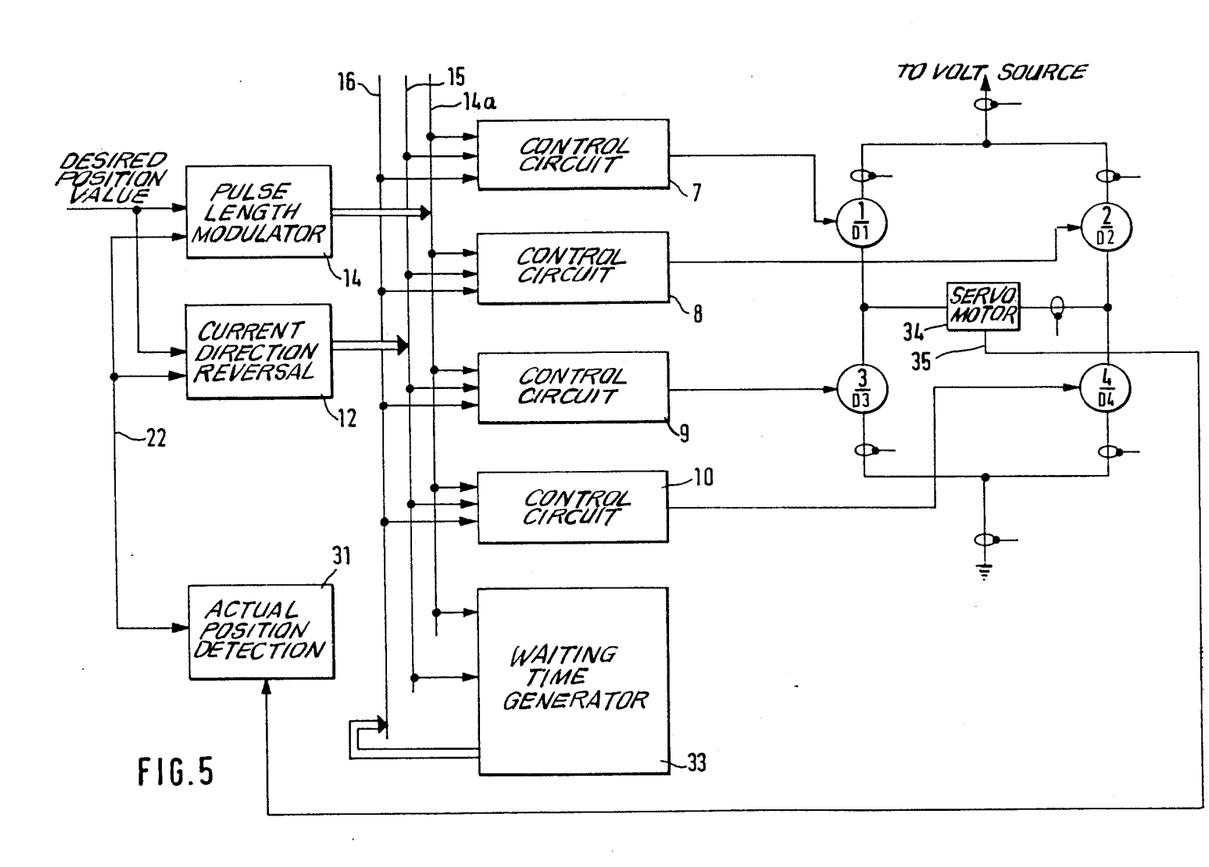
FIG. 5 is a variation of the circuit arrangement of FIG. 4 in which, however, instead of the current-detection circuit a position actual-value detection device is provided.

Each of the four semiconductor switches is controlled by a control circuit, not shown in FIGS. 1 and 2, but which can be noted in FIGS. 3-5. The control circuits are provided therein with the reference numbers 7-10. The construction and the control function of each control circuit can be noted from the following description of the switch states of the semiconductor switches 1-4 in FIGS. 1 and 2.

In FIG. 1 it is assumed that for a given direction of flow—arrow 11—in the load 5, the semiconductor switches 1 and 4 are closed during a current-application phase. There results an interruptable course of the current from the voltage source via the semiconductor switch 1, and load 5, and the semiconductor switch 4 back to the source of voltage.

The flow of current from the voltage source is interrupted in the manner that the semiconductor switch 1 is blocked while the semiconductor switch 4 remains closed. In this way the freerunning phase commences during which the current continues to flow, while fading away, through the ohmic-conductive load 5, corresponding to the dot-dash course of the current further over the conducting semiconductor switch 4 and initially over the freerunning diode D3. When the control circuit 9 in FIG. 3 has reported that the semiconductor switch 1 blocks and the freerunning diode D3 has taken on freerunning current, the semiconductor switch 3 is brought into the conductive state. It thus takes over a substantial part of the current flowing through the load 5.

When the load 5 is again to be fed current from the voltage source 6, the semiconductor switch 3 is first of all opened by the control circuit 9. When the control circuit 7 for the semiconductor switch 1 has reported that this process is complete, the semiconductor switch 1 is again closed. The timed switching operation described can start over again.

The semiconductor switch 4 remains at all times closed during the entire timed control for the current direction 11, its control circuit 10 being designed for this.

If a reversal of the direction of current to a direction opposite the arrow 11 in FIG. 1 is to take place in the load, which is determined by a current-direction reversal circuit 12 in FIGS. 3 to 5, then the corresponding control functions take place as follows during the freerunning phase in which the semiconductor switches 3 and 4 are closed:

First of all, the semiconductor switch 4 is opened. The current then flows in the load further over the semiconductor switch 3 and over the freerunning diode D2 back into the battery. As soon as it has been recognized that the semiconductor switch 4 is open, which can be effected with a monitoring unit 13—see FIG. 3—the semiconductor switch 2 is closed by its control circuit 8. The current in the load flows further, dying away against the voltage of the source of voltage until it has dropped to zero (end of the freerunning phase) and then again increases in the desired reverse direction (new current-application phase).

The semiconductor switch 3 remains closed during the entire time that current is to flow through the load in the direction opposite the arrow 11.

From the dot-dash course of the current in FIG. 2 it can be seen how the current flows in the freerunning phase when a current-direction reversal command is given in it by the current-direction reversal circuit 12 and the semiconductor switch 4 is already open.

If the command for the reversal of the direction of current is given during the current-application phase when the semiconductor switches 1 and 4 are closed, the semiconductor switch 1 is first of all opened and the semiconductor switch 3 then closed, as described above for the transition from the current-flow phase to the freerunning phase. In the freerunning phase which is then thus present, the further control of the semiconductor switches takes place in the manner also described above, as though the command for the reversal of the direction of flow had occurred originally in the freerunning phase.

FIG. 3 shows that an input signal, representing, for instance, a control deviation of a control variable which is to be regulated with the load 5, or a current control signal for the load 5 acts on a pulse-length modulator 14 and on the current-direction reversal circuit 12. The pulse-length modulator produces from the analog input signal a timed output signal which lies on a bus line 14a. The current-direction reversal circuit produces, at given limit values of the input signal, current-direction reversal commands on the bus line 15. An output of monitoring unit 13 is connected to another bus line 16. All bus lines are connected to inputs of four control circuits 7-10 for the four semiconductor switches 1-4.

In FIGS. 3–5 it is indicated that the freerunning diodes D1–D4 are integrated in the semiconductor switches 1–4 when the latter are developed in MOSFET technique. It is particularly suitable if the semiconductor switches 3 and 4 are N-Channel MOSFETs which are acted on by positive control voltages. The semiconductor switches 1 and 2 can also be MOSFETs, or else bipolar or other semiconductor switches.

With the monitoring unit 13, the potentials or voltages of the switch paths of the semiconductor switches 1–4 are monitored as well as the voltage on the load 5. For this the monitoring lines 16a–19 are used. Additional monitoring lines 21 and 22 report the control voltages for the semiconductor switches 4 and 3 back to the monitoring unit.

The circuit arrangement of FIG. 4 differs from that of FIG. 3 first of all by the fact that, as input signal, there is used a desired current value which is fed into the pulse-length modulator 14 and the current-direction reversal circuit 12. Furthermore, by an actual-value line 22 a current actual-value is fed into the pulse-length modulator and the current-direction reversal circuit. Within the pulse length modulator and the current-direction reversal circuit the difference between desired value and actual value is formed and a corresponding pulse-length-modulated output variable or a current-direction command is formed.

In order to form the actual current value, currents can be detected in the load 5, in all the semiconductor switches 1–4 and in the feed lines to the voltage source, which are not provided with reference numbers, as shown in detail by current detection lines 23–29. The current detection lines 23–29 are brought—shown combined with a strand 30—to a current-detection circuit arrangement 32.

Furthermore, in FIG. 4 the bus line 16, instead of being connected to the (voltage) monitoring unit 13 in FIG. 3, is connected to a waiting-time generator 33 with which the waiting times are produced upon the switching of the semiconductor switches so that no undesired switch states occur which cause, in particular, longitudinal currents in the bridge circuit.

As a whole, with the circuit arrangement of FIG. 4 a current is established in the load 5 which is equal to the desired value set.

The circuit arrangement of FIG. 5 differs from that of FIG. 4 by the fact that there is used as load a dc servomotor of a position-regulating device which is equipped with a position-feedback. The dc servomotor is designated 34. A position feedback line is designated 35. It leads to a position actual-value detection device 31 which, in its turn, produces on the actual-value line 22 an actual-value signal which corresponds to the position set with the dc servomotor. The actual value is fed, similarly to a position desired value, again into the pulse-length modulator 14 and the current-direction reversal circuit 12. The circuit shown in FIG. 5 otherwise acts in the same way as that of FIG. 4, in which connection, however, in this case the position predetermined by the position desired value is set by the dc servomotor 34.

Figure 6:
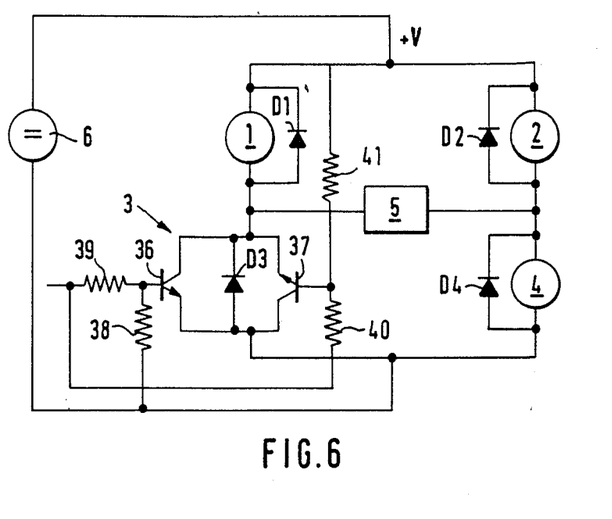
FIG. 6 shows the bridge output stage according to FIG. 1 with a semiconductor switch which is shown in more detail.
Figure 7:
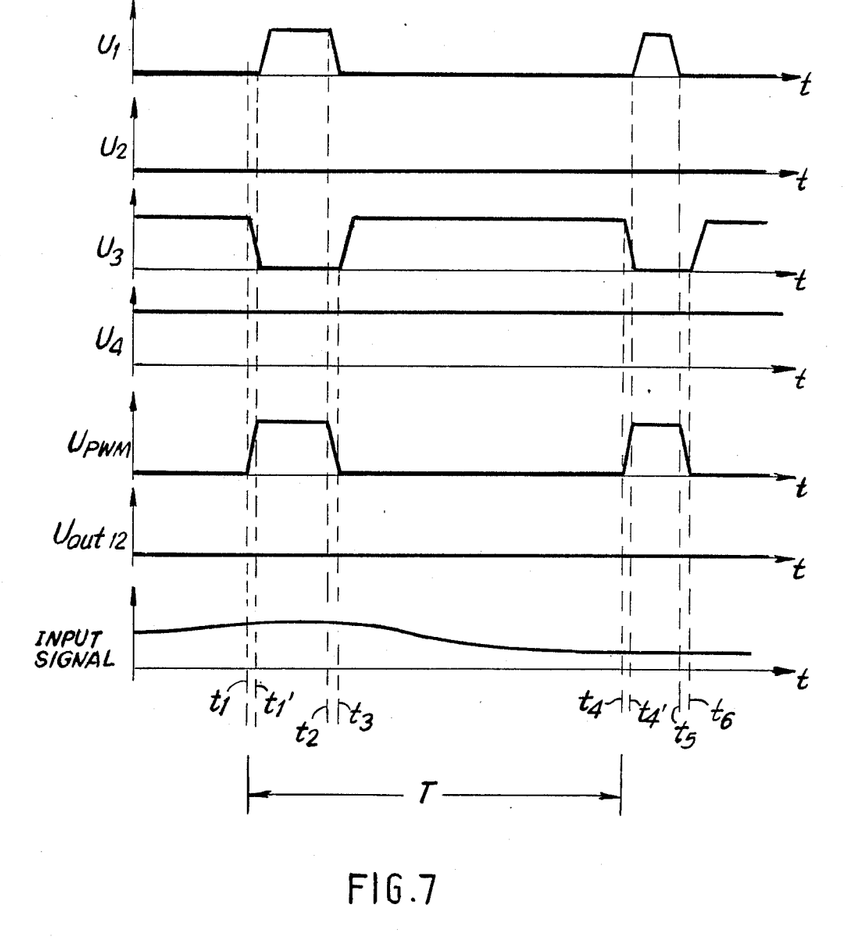
FIG. 7 is a time graph of the voltages $U_1$, $U_2$, $U_3$ and $U_4$ transformed from the currents in the semiconductor switches in FIG. 1 and of the output voltages $U_{PWM}$ of the pulse length modulator and $U_{out12}$ of the current-direction reversal circuit in FIG. 3 with reference to an input signal.

In FIG. 6, the semiconductor switch of the bridge which is designated generally as 3 is shown in further detail. It comprises two NPN bipolar transistors 36, 37 in accordance with FIG. 6, with the freerunning diode D3. The NPN bipolar transistors 36, 37 are, via in each case a resistor 38 and 39 respectively, at a potential of the voltage source and are controlled via the series resistors 40 and 41 respectively as explained in connection with FIGS. 1 and 2. In FIG. 7, $U_1$, $U_2$, $U_3$, $U_4$ show the variation with time of the voltages which correspond to the currents in the semiconductor switches 1, 2, 3, 4 in FIG. 1. The voltages $U_1$–$U_4$ are produced by transformation from the currents which flow in the branches of the bridge circuit. The transformers are indicated without reference numbers in FIG. 3. To the voltage courses $U_1$–$U_4$ there corresponds an input signal which, in accordance with FIG. 3, acts on the pulse-length modulator 14 and the current-direction reversal circuit 12. The output voltage of the pulse-length modulator is designated $U_{PWM}$ in FIG. 7 and the output voltage of the current-direction reversal circuit 12 is indicated as $U_{out12}$. A positive direction of current corresponding to the arrow 11 in FIG. 1 is to correspond to the output voltage $U_{out12}$ in FIG. 7. As already described in connection with FIG. 1, for this direction of current the semiconductor switches 1 are closed as from the time $t_1$, which is indicated by a high voltage level $U_1$, while the semiconductor switch 3 is opened, which is indicated by a low voltage level $U_3$. The semiconductor switch 2 is continuously blocked—see lower level $U_2$—while the semiconductor switch 4 conducts continuously—see high level $U_4$. If, in accordance with the voltage signal $U_{PWM}$, the clock ratio which is dependent on the input signal, the current flow from the voltage source 6 is interrupted at the time $t_2$, the current drops and thus the voltage $U_1$ drops in the branch in which the semiconductor switch 1 is located. In this freerunning phase which commences at the time $t_2$, the switch 3 is initially not yet made conductive; see the low remaining voltage level $U_3$. Only at the end of the freerunning phase at time $t_3$ when it is reported that the current through the semiconductor switch $U_1$ has entirely faded away is the semiconductor switch 3 made conductive; see the rising level of $U_3$ as from $t_3$. In this connection, the semiconductor switch 4 remains closed as always during this direction of flow; see high level $U_4$, and the semiconductor switch 2 remains open; see low level $U_2$.

In FIG. 7 it is further indicated how a shorter high level of the pulse $U_{PWM}$ up to $t_5$ than the time difference $t_1$ minus $t_2$ corresponds to a decreasing input signal as from the time $t_4$. The turn-on time of the switch 1 is correspondingly shortened, see the voltage $U_1$, as is the disconnect time or blocking time of the switch 3, see the voltage $U_3$, which, however, rises again after a further freerunning phase from $t_5$ to $t_6$.

In FIG. 7 the time difference $t_4$ minus $t_1$ corresponds to the period or repetition time of the pulse $U_{PWM}$ which is given off by the pulse-length modulator and which, in contradistinction to the pulse duty factor or the connecting time of the pulse, is constant independently of the input signal.

The said pulse duty factor is referred to there also as pulse pause ratio.

Figure 8:
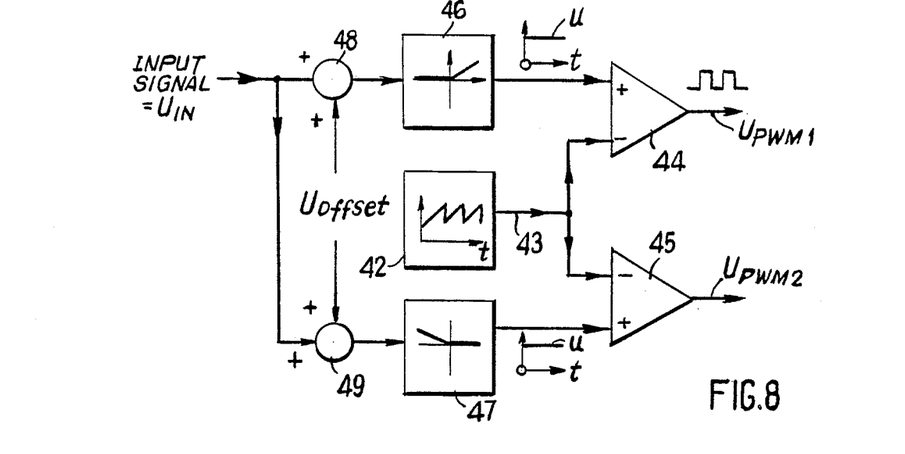
FIG. 8 is a preferred embodiment of a pulse-length modulator.

A preferred embodiment of the pulse-length modulator 14 of FIG. 5 is shown diagrammatically in FIG. 8. The pulse-length modulator comprises a sawtooth generator 42 with integrator which gives off a sawtooth output voltage on a line 43. The line 43 is connected to one input each of a comparator 44 and 45 respectively. A second input each of the two comparators is connected to the output of a function generator 46 and 47 respectively. The function generator 46 transforms a positive input voltage into a proportional output voltage if the input voltage is positive and does not produce an output voltage when the input voltage is negative. The function generator 47 does not produce any output voltage when the input voltage is positive and produces an output voltage proportional to the input voltage with reverse sign when the input voltage is negative. Both comparators are fed with the input signal $U_{in}$ via addition members 48, 49 into which an additional offset signal can be fed for displacement of the input voltage. The offset signal serves for the zeropoint displacement of the bend of the characteristic curve in the function members. When the offset signal is zero, the function generator 46 gives off, in the event of input signals greater than zero, an output signal which is compared in the comparator with the sawtooth signal on the line 43. Conversely, in the case of an input signal less than zero the comparator 45 is acted on by the function generator 47 and gives off an output signal. The output signals of the two comparators are designated $U_{PWM1}$ and $U_{PWM2}$. They pass into the bus line 14a in FIG. 5. It is pointed out that for an understanding of the circuit arrangement in FIG. 5 and of the time functions of the switch states in FIG. 7, an output signal $U_{PWM}$ of the pulse-length modulator which can correspond, for instance, to $U_{PWM}$ in FIG. 8 is sufficient.

Figure 9:
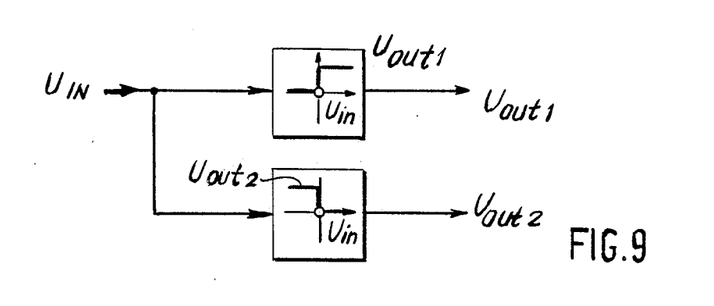
FIG. 9 is a preferred embodiment of a current-direction reversal circuit.

A preferred embodiment of the current-direction reversal circuit comprises two function generators 49, 50 which are fed parallel to each other with the input signal $U_{in}$ and on the outputs of which the output voltages $U_{out1}$ and $U_{out2}$ are produced. The characteristic curves of the function generators are shown in the blocks. The function generator 49 gives off a constant output voltage $U_{out1}$ only in the case of a positive input voltage while the function generator 50 gives off an output voltage $U_{out2}$ in the event of a negative input signal. These signals $U_{out1}$ and $U_{out2}$ are fed into the bus line 15 in FIG. 3. It is pointed out that for an understanding of the functions of the entire circuit arrangement for the clock control of semiconductor switches one output signal $U_{out}$ is sufficient, for which reason only one output signal $U_{out12}$ is shown in the time graph of FIG. 7.

Figure 10:
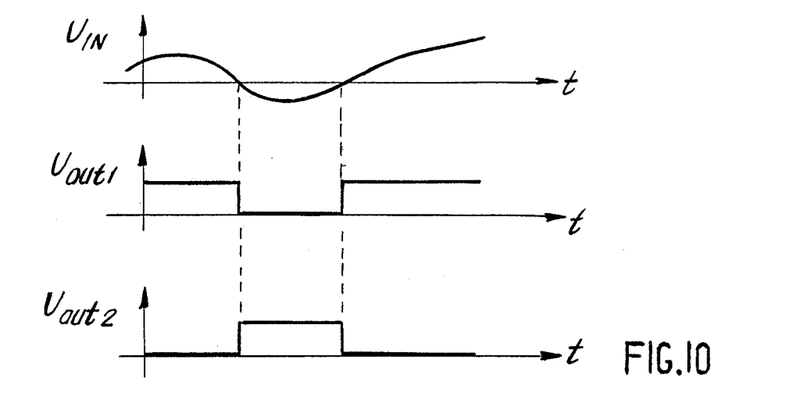
FIG. 10 are time graphs of the output signals of the current-direction reversal circuit of FIG. 9.

In FIG. 10, on the other hand, the output signals $U_{out1}$ and $U_{out2}$ are shown as a function of an input signal $U_{in}$ in the event of an offset voltage of zero.

Figure 11:
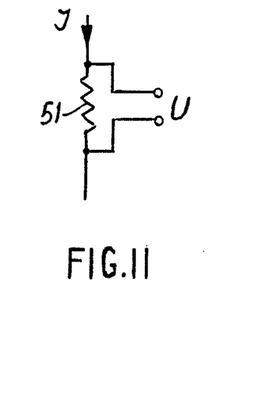
FIG. 11 is an example of a current detection circuit.

FIG. 11 shows an example of a current-detection circuit which converts the currents in the branches of the bridge circuit and in other lines connected with the bridge circuit into a proportional voltage, for instance the voltages $U_1$, $U_2$, $U_3$, $U_4$. Each current-detection circuit consists of a measurement resistor, for instance, 51 on which a voltage U drops as a function of a current I.

Figure 12:
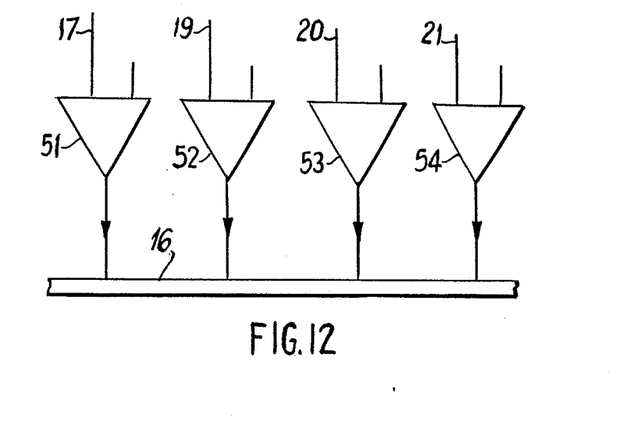
FIG. 12 is a monitoring unit for all semiconductor switches.

FIG. 12 shows a monitoring unit for all semiconductor switches. The monitoring unit comprises four comparators 51-54 each of which is preset to a desired value and the outputs of which lead to the bus line 16. Inputs of the comparators 53, 54 are connected to the lines 20, 21 at the control inputs of the semiconductor switches 4 and 3. Further monitorings take place via the lines 17 and 19 on the load 5 by means of the comparators 51 and 52.

Figure 13:
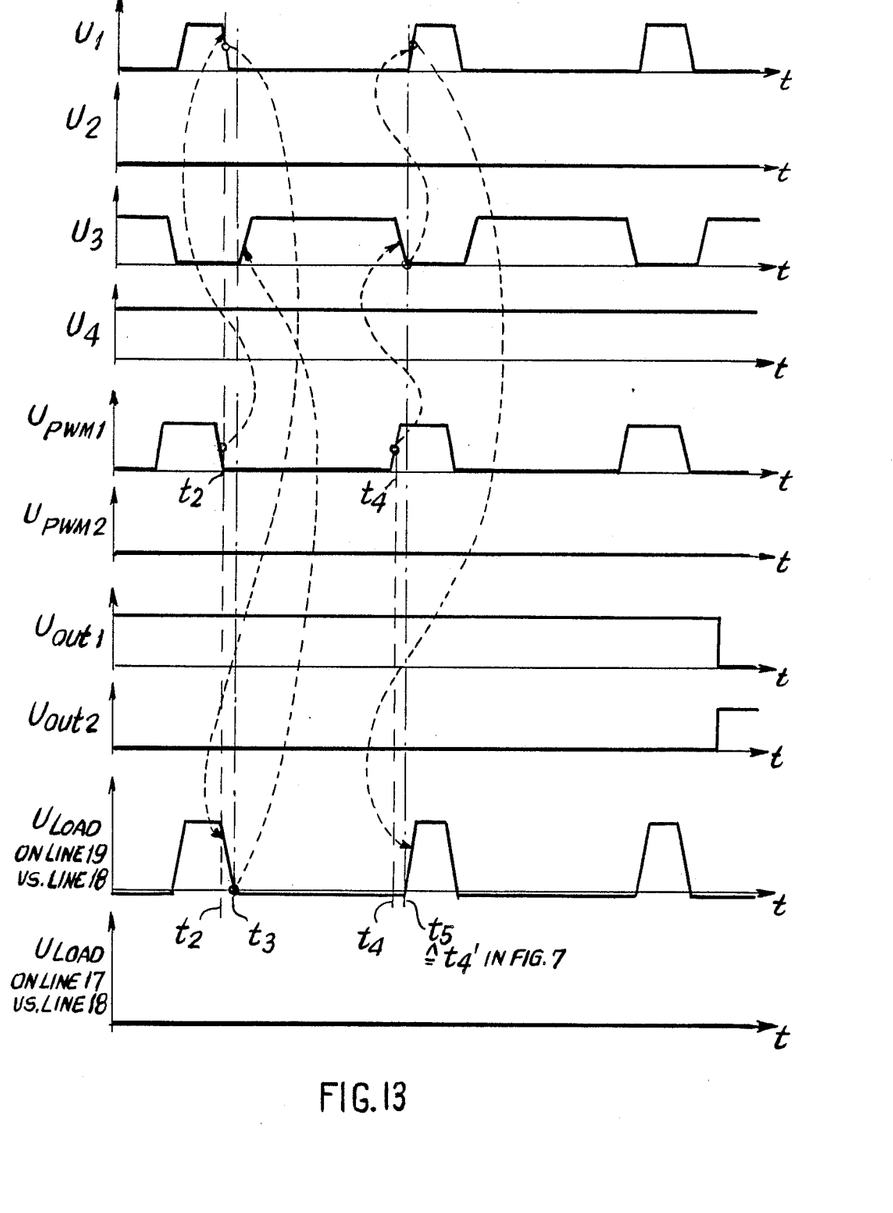
FIGS. 13 are time graphs of the signals in the bridge final stage with the control circuit with positive direction of current through the load.

The function of the monitoring unit will be explained below with reference to FIG. 13 in which time graphs of the signals $U_1$–$U_4$, $U_{PWM1}$, $U_{PWM2}$, $U_{out1}$, $U_{out2}$ and the load voltages with respect to ground potential are shown, namely, on the one hand, as the load voltage on the line 19 and, on the other hand, as the load voltage on the line 17 with respect to ground potential. FIG. 13 concerns a given direction of current through the load, in this case positive. FIG. 13 shows the variations with time furthermore even more accurately than they are shown in FIG. 7. The starting point is the time $t_2$ at which the output signal $U_{PWM1}$ of the pulse-length modulator drops to a lower level and directly blocks the semiconductor switch 1. When the voltage signal $U_1$ on the semiconductor switch 1 becomes smaller, the voltage on the load resistance $U_{load}$ on line 19 with respect to ground potential also drops. If in this connection the voltage on the line 19 reaches a preset threshold value at the time $t_3$, this signals the end of the freerunning phase between $t_2$ and $t_3$ and the semiconductor switch 3 is made conductive, which is signaled by the rising potential $U_3$. At the time $t_4$ the output signal $U_{PWM1}$ of the pulse-length modulator, on the other hand, gives the command to block the semiconductor switch 3 which, at the time $t_5$, reaches a predetermined level, which again causes a switching-on of the semiconductor switch 1; see rising signal level $U_1$ on the last-mentioned semiconductor switch.

Figure 14:
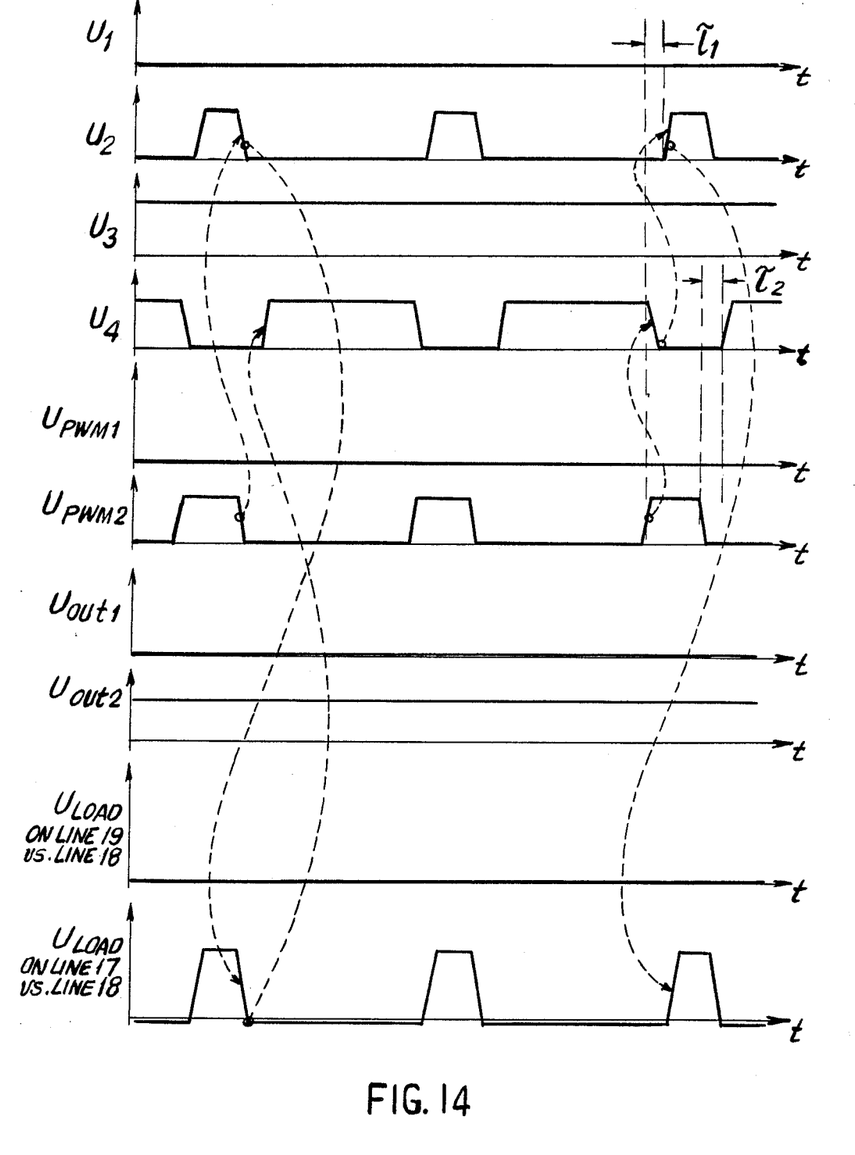
FIG. 14 are time graphs similar to FIG. 13 with reversed, negative direction of current through the load.

FIG. 14 shows, in manner similar to this the variations with time of the signals when a negative current direction through the load 5 is caused by the output voltages $U_{out1}$ and $U_{out2}$ of the current-direction reversal circuit 12. In this case, the disconnecting of one of the semiconductor switches 2 and 4 is determined directly by the output signal $U_{PWM2}$ of the pulse-length modulator while the connecting of these semiconductor switches takes place with time delay when the monitoring unit signals that the voltage condition has been reached.

Figure 15:
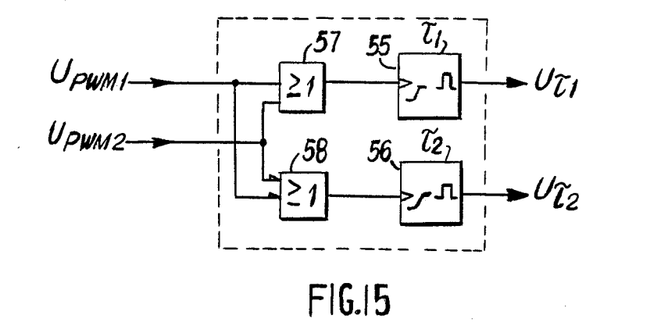
FIG. 15 is an embodiment of a waiting-time generator.
Figure 16:
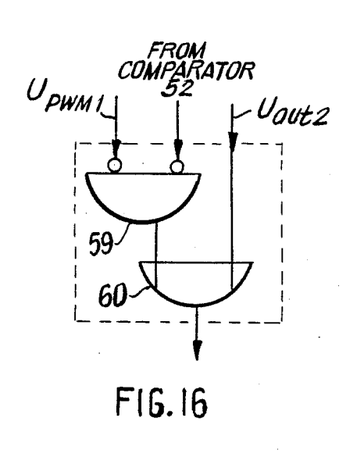
FIGS. 16, 17, 18, 19 are embodiments for the control circuits 7, 8, 9 and 10 respectively in FIGS. 3 and 5.

In FIG. 15 there is shown an embodiment of a waiting-time generator 33 of FIG. 5 which causes the turning on of given semiconductor switches of the bridge circuit, not as a function of a monitored voltage condition but of a fixed predetermined waiting time $\tau_1$ or $\tau_2$. The delay $\tau_1$ takes place between the positive ascending flank of an output signal $U_{PWM1}$ or $U_{PWM2}$ of the pulse-length modulator and the semiconductor switch which is to be connected to this signal while the delay $\tau_2$ takes place between the rear flank of the signal $U_{PWM1}$ or $U_{PWM2}$ and the semiconductor switch which is to be made conductive by this. The delay times $\tau_1$ and $\tau_2$ are entered as examples in the right-hand upper part of FIG. 14.

In FIG. 15 there is shown an embodiment of a waiting-time generator with which the time delays $\tau_1$ and $\tau_2$ are produced. It consists essentially of two monostable flip-flops with trigger input 55 and 56 which from a flank at the input produce a pulse of the length 1 or 2. The monostable flipflops are controlled, as shown in FIG. 15, via OR-members 57, 58 by the outputs $U_{PWM1}$ or $U_{PWM2}$ of the pulse-length modulator. The OR-member 57 is so connected that it permits the passage of the front flank of $U_{PWM1}$ in order to produce the delay time $\tau_1$ with the monostable flipflop 55. The OR-member 58, on the other hand, has inverting inputs so that the rear flank is passed as trigger signal for the production of $\tau_2$.

FIGS. 16–19 show examples of the control circuits which are to be viewed in combination with the monitoring unit of FIG. 12. The functions of the control circuits result directly from the generally known symbols; in addition, the signal diagrams in FIGS. 13 and 14 can be utilized:

The control circuit 9 in FIG. 3 consists of an AND-member 59 with inverting inputs as well as a subsequent OR-member 60. With the OR-member 59 there is effected the clocking of the switch 3 which is made conductive when the output signal $U_{PWM1}$ of the pulse-length modulator is low and the signal voltage on the line 19 of the monitoring unit 13, see FIG. 12, is less than the predetermined threshold. The semiconductor switch 3, on the other hand, is continuously connected via the OR-member 60 directly when the output voltage $U_{out2}$ of the current-direction reversal circuit 12 is high for negative directions of current.

Figure 17:
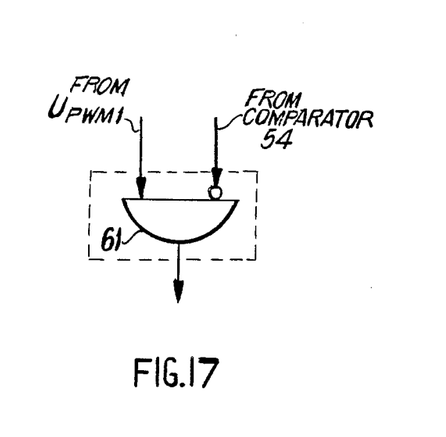
Figure 18:
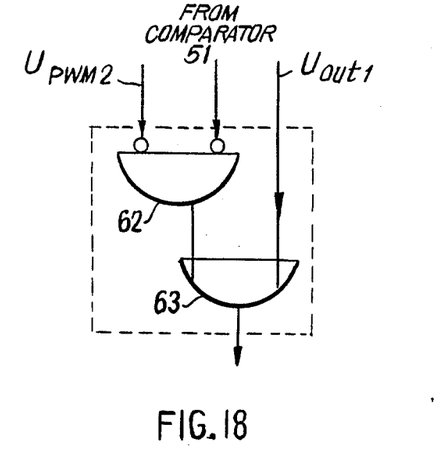
Figure 19:
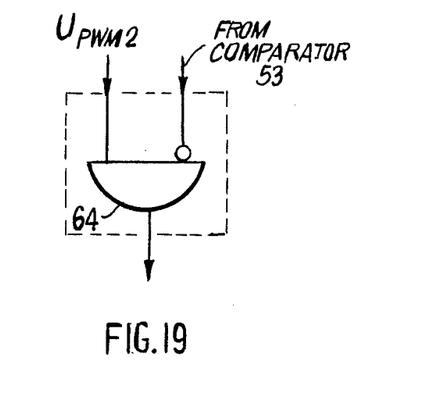

The control circuit 7 in FIG. 3 for the semiconductor switch 1 is shown in FIG. 17. It consists of an AND-member 61 with an inverting input which lies at the output of the comparator 54 in FIG. 12. The outer input is fed with $U_{PWM1}$. Similar to the control circuit in FIG. 16, the control circuit 10 of FIG. 3 is shown in FIG. 18 with the AND-member 62 with inverting inputs as well as the following OR-member 63. The AND-member is fed here with the signal $U_{PWM2}$ and from the comparator 51. The one input of the OR-member, on the other hand, receives the signal $U_{out1}$ of the current-direction reversal circuit and continuously switches the semiconductor switch 4 when the output signal $U_{out1}$ of the current-direction reversal circuit 12 gives off a signal with high level. The control circuit 8 of FIG. 3 shown in FIG. 19 corresponds, in its turn, to the control circuit according to FIG. 17, with the exception that in this case an AND-member 64 having an inverting input is connected to the output of the comparator 53 while the other noninverting input is acted on by the signal $U_{PWM2}$.

I claim:

1. In a system including a bridge circuit for the timed control of semiconductor switches, in parallel with each of which there is a freerunning diode, which switches are located in branches of the bridge circuit; and wherein
   the bridge circuit comprises four branches, a first and a second of said branches being connected at a first node of the bridge circuit, a third and a fourth of said branches being connected at a second node opposite said first node, said first and said third branches joining at a third node of said bridge circuit and said second and said fourth branches joining at a fourth node opposite said third node; said first and said second nodes being connectable to an external source of dc voltage, there being an ohmic-inductive load, in particular a dc motor, connected between said third and said fourth nodes; and wherein
   two semiconductor switches which lie diagonally opposite each other in the bridge circuit are closed during a current-application phase, and a freerunning current flows through the load in a freerunning phase, the improvement wherein the system further comprises
   feedback means connected to the switches in each of said branches for operating said switches to place said switches in states of conduction and nonconduction to current induced by said voltage source, said first branch being diagonally opposite said fourth branch and lying alongside said second branch, said third branch lying alongside said fourth branch and diagonally opposite said second branch, said feedback means operating said switches to provide that:
   at the start of a freerunning phase only one of the two diagonally opposite semiconductor switches in the first and the fourth branches is opened and thereupon a semiconductor switch of the third branch is closed; and
   before the start of a then following current-application phase, the semiconductor switch of the third branch is opened before the opened semiconductor switch of the first branch is again closed.

2. The system according to claim 1, wherein
   in the freerunning phase said semiconductor switch of the third branch is closed when a freerunning diode in the third branch conducts freerunning current.

3. The system according to claim 1, wherein said feedback means comprises:
   a monitoring circuit which monitors a voltage on the load and switch states of said semiconductor switches; and
   one control circuit for each semiconductor switch, each said control circuit being driven by said monitoring means.

4. The system according to claim 2, wherein said feedback means comprises:
   a monitoring circuit which monitors a voltage on the load and switch states of said semiconductor switches; and
   one control circuit for each semiconductor switch, each said control circuit being driven by said monitoring means.

5. The system according to claim 1, wherein said feedback means comprises:
   a waiting time generator for producing fixed waiting times; and
   a control circuit for each semiconductor switch, each said control circuit being driven by said waiting time generator.

6. The system according to claim 2, wherein said feedback means comprises:
   a waiting time generator for producing fixed waiting times; and
   a control circuit for each semiconductor switch, each said control circuit being driven by said waiting time generator.

7. The system according to claim 3, wherein said feedback means comprises:
   a pulse-length modulator for driving the control circuits.

8. The system according to claim 5, wherein said feedback means comprises:
   a pulse-length modulator for driving the control circuits.

9. The system according to claim 1, wherein said feedback means comprises:
   current means for the controlled current-direction reversal in the load during a freerunning phase of the semiconductor switch of the fourth branch while the semiconductor switch of the third branch remains closed; and thereupon the current means closes the semiconductor switch of the second branch.

10. The system according to claim 9, wherein
    for the controlled current-direction reversal, by said current means, in the load during the current-application phase, said current means opens said first-branch switch which was timed-switched before the reversal of the direction of current, and closes the third-branch switch, and opens a switch of the two diagonally opposite switches of the first and the fourth branches which is still closed while the third-branch switch remains closed, the current means thereupon closing the second-branch switch lying diagonally opposite said third-branch switch.

11. The system according to claim 10, wherein said feedback means comprises a plurality of control circuits for operating respective ones of said switches, said current means in each case drives the control circuit for each semiconductor switch.

12. The system according to claim 9, wherein said feedback means comprises a plurality of control circuits for operating respective ones of said switches, said current means in each case drives the control circuit for each semiconductor switch.

13. The system according to claim 9, wherein said semiconductor switches comprise MOSFET transistors, each having an integrated freerunning diode.

14. The system according to claim 9, wherein each of the semiconductor switches comprises two interconnected NPN bipolar transistors with an additional freerunning diode.

15. The system according to claim 9, wherein said third and said fourth branch switches lying alongside are MOSFET semiconductor and said first and said second branch switches are bipolar transistors.

* * * * *